United States Patent [19]

Cook et al.

[11] Patent Number: 5,393,177
[45] Date of Patent: Feb. 28, 1995

[54] TOOL WEAR COMPENSATION SYSTEM

[75] Inventors: Kenneth J. Cook, Troy; Thomas C. Roth, Mt. Clemens, both of Mich.; Frank D. Hasse, Sheldon, Iowa; Gerald W. Mathie, Holly, Mich.

[73] Assignee: Valenite Inc., Madison Heights, Mich.

[21] Appl. No.: 949,275

[22] Filed: Sep. 14, 1992
(Under 37 CFR 1.47)

[51] Int. Cl.⁶ .............................................. B23B 39/00
[52] U.S. Cl. ....................................... 408/147; 408/13; 408/159
[58] Field of Search ................. 82/1.2; 408/8, 13, 147, 408/158, 159

[56] References Cited

U.S. PATENT DOCUMENTS

| | | | |
|---|---|---|---|
| 3,285,101 | 11/1966 | Klingel | 408/147 |
| 3,740,161 | 6/1973 | Milewski | 408/158 |
| 3,753,624 | 8/1973 | Walker et al. | 408/159 |
| 4,009,968 | 3/1977 | Vandenkieboom | 82/1.2 |
| 4,412,465 | 11/1983 | Wright | 408/13 |

*Primary Examiner*—Daniel W. Howell
*Attorney, Agent, or Firm*—Bill C. Panagos

[57] ABSTRACT

Alternative tool wear compensation modules employing drawbar actuated tool position adjustment or electrically activated solid-state prime mover adjustment including means for physically sensing and verifying the extent of adjustment without awaiting the gaging of successive work piece dimensions following compensation adjustment. In one embodiment, a piezoelectric stack is employed with a flexure unit mounted tool to produce adjustment deflection through controlled voltage applied to the piezoelectric stack.

9 Claims, 4 Drawing Sheets

TOOL WEAR COMPENSATION SYSTEM

BACKGROUND OF THE INVENTION

Tool wear incurred in machining operations which results in production part size variation requires adjustment in tool position which has been accomplished in various ways. Tool holders in the form of cartridges rigidly mounted with provision for deflection of a cutting insert by a central drawbar acting on a ramp surface are commonly employed for such purpose, particularly in the case of boring tools where the drawbar is reciprocated to relax deflection for withdrawal of the cutting point free of part contact and oppositely actuated to register with an adjustable stop to deflect the tool point to its effective cutting position.

In such systems, automatic part size gaging coupled to means for effecting drawbar stop adjustment have been effectively used in order to maintain part size uniformity over production runs within the capacity of the tool point between sharpening or replacement intervals. A typical system of this type is disclosed in U.S. Pat. No. 3,740,161 issued Jun. 19, 1973.

As an alternative to ramp surface displacement for deflecting adjustment of the tool point, a rigidly mounted tool, such as at the end of a boring bar, may be adjusted through radial or angular deflection of the entire boring bar at its mounting base; again, automatic gaging coupled with means for effecting such deflection, has been employed to maintain part size uniformity through wear compensation means. A typical system of this type is disclosed in U.S. Pat. No. 3,753,624 issued Aug. 21, 1973.

While such systems are adapted to generate adjustment of the tool point automatically, verification of the proper adjustment in conventional practice is not established until successive parts are gaged following the adjustment. Such open loop adjustment leaves uncertainty as to whether a proper adjustment has been made; for example, if the adjustment involves a stepper motor which does not move, or a microscrew for stop adjustment is bound up, or a piston assembly for retracting a drawbar fails to retract and seat on an adjusted microscrew stop.

BRIEF DESCRIPTION OF THE PRESENT INVENTION

A principal improvement feature of the present invention is to add means for monitoring the actual movement of the tool point during its adjustment to a new position so as to verify that a proper adjustment has been completed without waiting for the gaging of a successive part, thus providing a "closed loop" tool wear compensation system. In the case of a drawbar adjustment effected by interengaging ramp surfaces of a deflectable tool insert at the end of the drawbar, a supplemental equal angle ramp surface is provided at the inner end of the drawbar, adjacent its registration against an adjustable stop, with a transducer engagement providing an electrical signal directly proportional to ramp surface actuation identical to the drawbar ramp surface actuation of the tool point. The drawbar may be of rotating or nonrotating construction.

In the case of entire boring bar deflection, a piezoelectric drive unit has been adapted to impose an angular deflection on the boring bar proportional to electrical voltage imposed on the piezoelectric drive unit. A calibrated strain gage, combined with the piezoelectric drive unit provides a closed loop monitoring of the tool point deflection.

DETAILED DESCRIPTION OF FIRST EMBODIMENT

Figure 1:
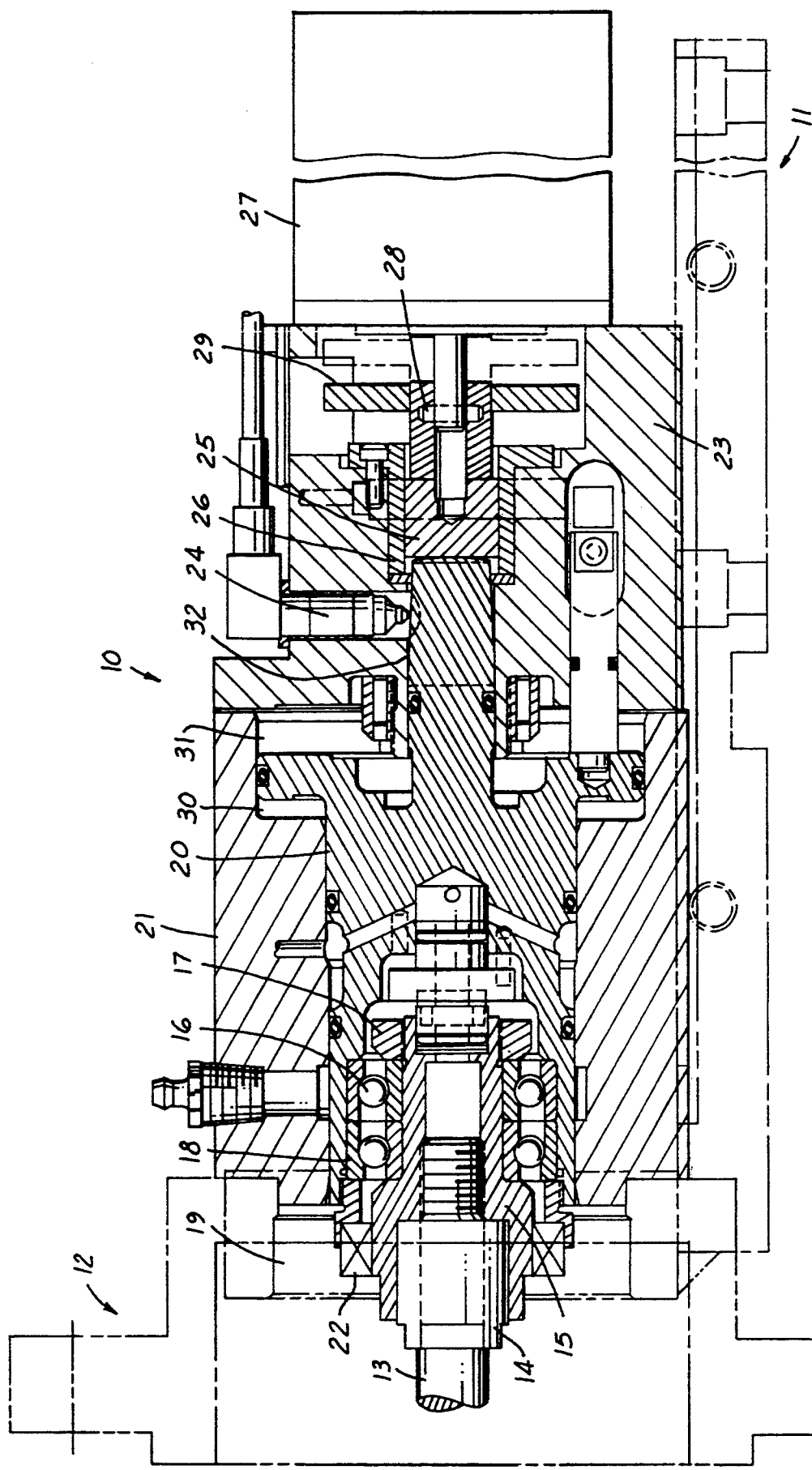
FIG. 1 is a sectional side elevation of a first embodiment of tool wear compensator employing drawbar adjustment with closed loop feedback.

With reference to FIG. 1, compensator assembly 10 is mounted on a machine tool base, with mounting bracket 11, in alignment with mounting bracket 12 for a direct drive motorized spindle. Drawbar 13 actuates a standard "KAMSET" style tool of The Valeron Corporation such as disclosed in said U.S. Pat. No. 3,740,161. Alternatively, drawbar 13 may actuate a pivot head, a feedout head or any other type of tool that can be adjusted by a drawbar. When moved all the way to the left, the tool is retracted out of machining position, and is actuated to machining position when the drawbar moves from its leftmost position to a preset position to the right. The drawbar rotates with the tool and spindle and is secured in the compensator by quick-lock collet assembly 14 within rotating drawbar coupling 15 having secured to it the inner races of bearings 16 held by bearing locknut 17. Outer bearing races 18 are secured by bearing cap 19 to piston assembly 20 mounted inside of mechanical housing 21. Dirt, coolant and other debris are kept out of the bearing by labyrinth seal 22.

Piston assembly 20 can move axially and is rotationally stationary. Housing 21 has attached to it motor/feedback housing 23 which contains feedback transducer 24, precision microscrew 25, and its bushing 26. Stepping motor 27 is coupled to microscrew 25 through a sliding coupling pin 28. Manual actuated thumb wheel 29 is used for visual indication of operation and also for position set-up of piston assembly 20. Thumb wheel 29 is also connected to microscrew 25, which moves precisely axially with rotation of stepping motor 27.

Piston 20 is actuated by pressurized fluid flowing into or out of the chambers 30 and 31 controlled by appropriate valving to move the piston axially to extremity positions—left for tool retraction and right for active tool position. Transducer 24 is actuated by a conical surface on extension 32 of piston 20 and can monitor its relative axial position by the corresponding displacement normal to the piston axis. Accordingly, through the connection of piston 20 to drawbar 13, transducer 24 can measure and verify through electronic scaling, the position of the tool point. During initial set-up, operating fluid is ported into chamber 31 which advances piston 20 to its extreme left position. Microscrew 25 is adjusted to contact the spherical end of extension 32, and then retracted by a preset amount designated as a "home" position, which is accomplished by turning set-up thumb wheel 29. Accordingly, when operating fluid flows into chamber 30 and out of chamber 31, the spherical face of piston 20 moves axially to the right, stopping on the flat face of microscrew 25. Transducer 24 measures the position of piston 20 on its conical surface 32 which correlates to the initial machining position of the cutting tool point as actuated by drawbar 13. The position sensed by transducer 24 can be electronically stored as the "home" position of the piston drawbar assembly. This information is important for repositioning the system automatically to "home" using the stepping motor controlled system.

In summary, during machining operations, tools will experience wear and through the use of a gaging means, such a shown in U.S. Pat. No. 3,740,161, when a dimensional limit has been exceeded, adjustment of the cutting tool point will compensate for such wear as follows: When the piston assembly is in the retract position (all the way to the left), this is sensed by transducer 24. The amount that the microscrew moves to the right of the "home" position is exactly the distance the drawbar assembly must move in order to compensate for the tool wear measured during the prior operation. When fluid is introduced into chamber 30, piston assembly 20 moves to the right and will stop on the face of the microscrew 25, which is at a new position. Transducer 24 can verify this new tool part position, because it will be displaced by a larger conical diameter, which is proportionate to the cutting tool point movement. Therefore, this sequence will repeat until the electronic control system has determined that the tool can no longer be compensated for wear and a tool wear limit has been exceeded.

DETAILED DESCRIPTION OF SECOND EMBODIMENT

Figure 2:
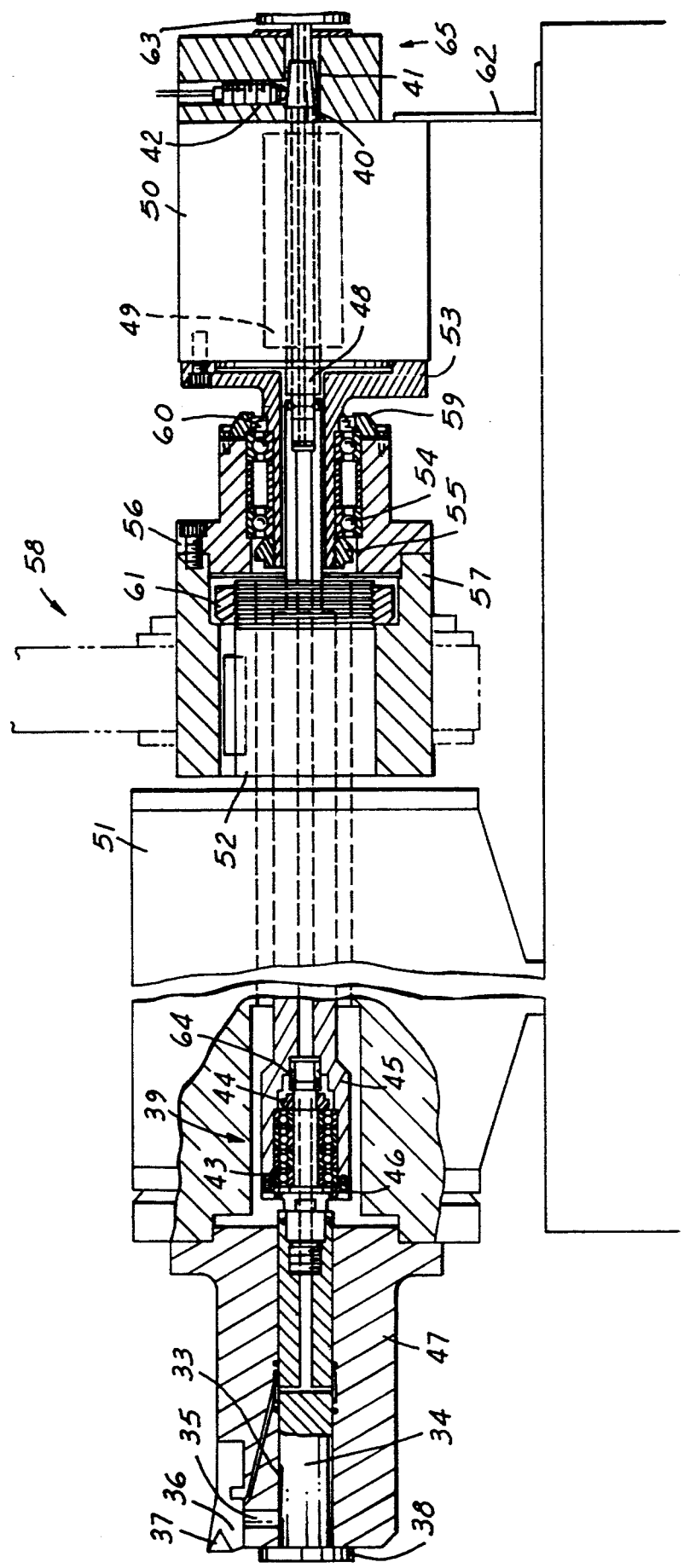
FIG. 2 is a sectional side elevation of a second embodiment, again employing drawbar actuated compensating adjustment.

With reference to FIG. 2, a spindle mounted all electric tool wear compensating module with transducer feedback is disclosed. In this case, the standard "KAM-SET" compensation cutting tool, referred to in the description of the first embodiment, is illustrated with ramp surface 33 on the outer end of drawbar 34 shown with push rod 35 deflecting the tool mounting end of cartridge 36 and cutting tool 37 to an outward extremity position corresponding to full retraction of drawbar 34 limited by end stop flange 38. At the other nonrotating extremity of drawbar assembly 39, a stepper motor lead screw 40 connected to the drawbar is provided with conical surface 41 shown at corresponding maximum radial displacement of transducer 42. In this case, the rotating member 34 of drawbar assembly 39 is attached to the inner races of bearings 43 by retention nut 44, and is contained in the nonrotating section 45 of the drawbar assembly by end cap 46. Accordingly, axial displacement of drawbar section 45 causes equal axial displacement of the rotational portion of the drawbar in tool body 47. Axial displacement necessary to effect tool compensation by moving drawbar 44 is produced by lead screw 40, which is pinned at 48 to the nonrotating extremity of the drawbar and moved axially by nut 49 which is mechanically secured to the rotor of stepper motor 50 having built-in lead screw and nut. Since the lead screw has a tapered conical section 41, transducer 42 can measure the position of the drawbar lead screw assembly which is proportional to the tool point position. The closed loop feedback feature described for the first embodiment is accordingly likewise achieved in the second embodiment.

In this second embodiment, the motor drawbar system is mounted to the spindle 51, shown as a commercial Parker Majestic Spindle No. 1292, which allows the spindle to be repositioned without having to realign the compensation system. In providing such mounting, the outside frame of stepping motor 50 must remain stationary and at the same time, be mechanically coupled to the spindle assembly 52, which is rotating. This is accomplished by motor adapter plate 53, connected to the inner races of bearing 54 and locked to them by nut 55. The outer races of bearings 54 are contained in the bearing housing 56, which is attached to pulley adapter 57 rotated through V-belts and pulley 58. Bearings 54 are secured in bearing housing 56 by end cap 59, with labyrinth seal 60 adapted to keep dirt and foreign debris out of bearings 54. Locknut 61 is used to secure pulley adapter 57 to the rear of the spindle 52. Bracket 62 is used to ensure that the outer frame of motor 50 will not rotate. Since the motor drawbar system is mounted to the back of the spindle, any force required for tool actuation is not impressed on the spindle bearings; also, since the major portion of drawbar system does not rotate with the spindle in this design, due to bearing pack 43 at the tool end of the spindle, any drawbar whip is eliminated.

Coolant can be induced into this system, if required in the cutting process, by dublin coolant inducer 63 feeding through the center of lead screw 48 to stationary drawbar 34 with a rotating face seal 64 provided at the interface between relatively rotating portions of the drawbar.

Optionally, an encoder 65 may be mounted on the back of the stepping motor 50 in place of linear transducer 42, which would also enable tool point position feedback to be accomplished. In an optimum design, an optical encoder as well as an LVDT type transducer could be used to incorporate both methods of feedback. The encoder would be able to provide both rotational information and velocity which could be used, for example, to provide contour machining. By combining with the transducer, an absolute position feedback device, would be assured.

DETAILED DESCRIPTION OF THIRD EMBODIMENT

A rotary tool compensation mechanism is disclosed utilizing an electrically actuated solid-state prime mover. The basic concept is a tool compensator without drawbar utilizing a piezoelectric drive unit for deflecting the tool and thus compensate for wear or sizing. Three different means for actuating the piezoelectric actuator by voltage are disclosed employing respectively a rotary contact assembly at the rear of the spindle, an electrical signal introduced through a rotary transformer assembly, and a voltage introduced through a slip ring assembly.

Figure 3:
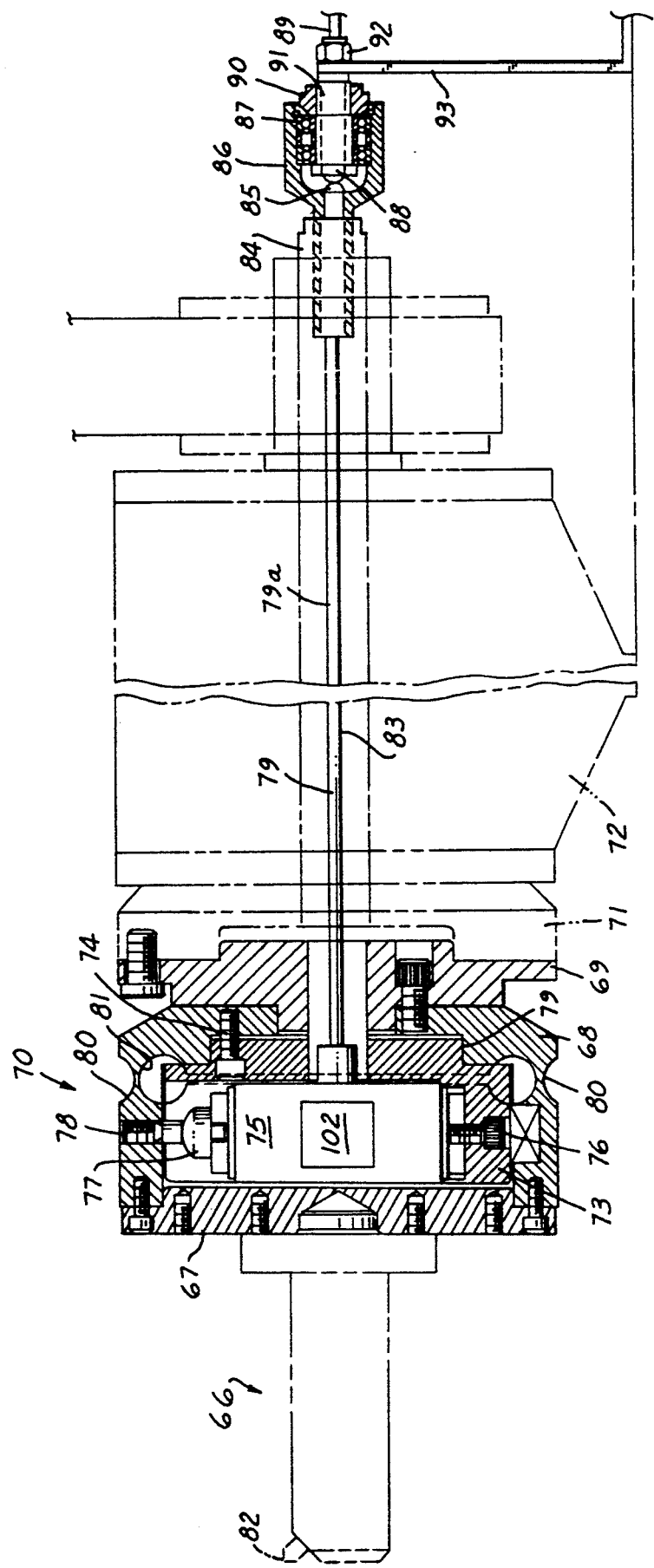
FIG. 3 is a partially sectioned side elevation of a third embodiment utilizing an electrically actuated solid-state prime mover for effecting compensation adjustment.

With reference to FIG. 3, boring tool 66 is mounted to front plate 67, which is secured to flexure unit 68 mounted on adapter 69, with the total assembly 70 secured to face 71 of spindle 72, again illustrated as a commercial Parker Majestic No. 1292. Flexure unit 68 has an internal piezoholder 73 mounted by screws 74 to the fixed section of the flexure unit 68. Piezoelectric stack 75 is secured to holder 73 by screw 76. The other end of piezoelectric stack 75 has a spherical button 77 which is preloaded by adjustment screw 78, secured in flexure unit 68. Accordingly, when a voltage is applied to piezoelectric stack 35 by rotary conductor 79 running through the center of spindle 72, piezoelectric stack 75 changes its mechanical length pushing on radially stationary holder 73 reacting at shoulder 79 on a rigid portion of flexure unit 68 causing tool assembly 70 to be deflected along an angular path established by a pair of external and internal linear grooves 80 and 81 providing relatively thin unidirectional flexure sections.

The radial plane of such flexure coincides with the radial plane of tool point 82. Accordingly, voltage applied to piezoelectric stack 75 will produce a radially outward deflection of tool point 82 proportional to the voltage, expansion characteristics of the piezoelectric stacks and geometry of the assembly 70. The electronic actuating signal is fed by conductor 79 through insulating sleeve 83 via a rotary contact assembly consisting of adapter 84, spherical contact 85, bearing housing 86 and bearing 87 passing voltage from stationary contact 88. The signal from an electronic gage compensation system is fed through stationary conductor 89 to the stationary contact assembly comprising bearing retainer 90, stationary contact housing 91, retaining nut 92 and mounting bracket 93. Bearings 87 enable the rotary contact housing 86 to be axially symmetric with stationary contact 85 so that compensation signal on stationary conductor 88 can be impressed on piezoelectric stack 75 through the contact assembly and rotary conductor 79.

Figure 3A:
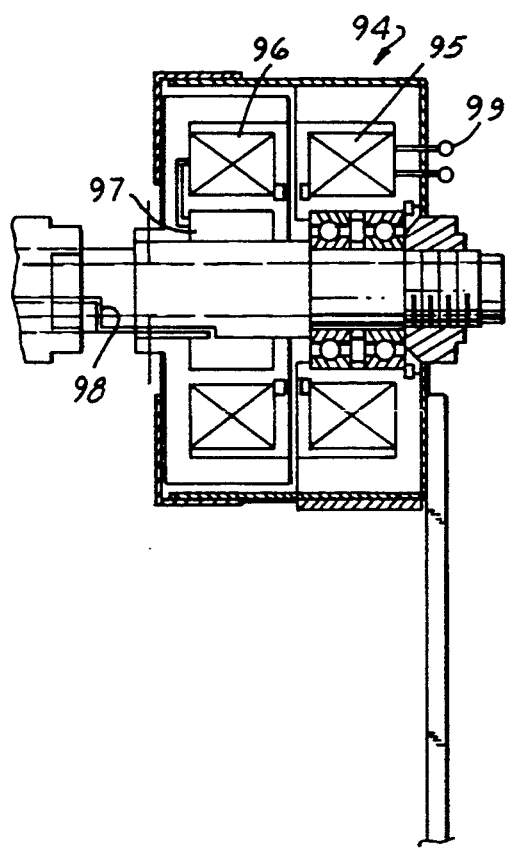
FIG. 3A is a fragmentary sectional view of a modified electrical connecting unit for the compensator illustrated in FIG. 3.

With reference to FIG. 3A, a modification for conducting the electrical signal into the system is provided through a rotary transformer assembly 94 comprising stationary coil 95 and the following rotating components of secondary coil 96, electronics 97 and conductor 98, which connect to conductor 79. The compensation signal, using rotary transformer assembly 94 is an AC type applied to rotary transformer contact 99. The AC input signal enables transformer action between primary and secondary coils with the secondary coil rotating and the primary coil stationary. Electronics 97 on the rotational side of the transformer converts the AC signal to a DC voltage coupled with rotating conductor 98, connected to conductor 79 and piezoelectric stack 75. Accordingly, it is clear that mechanical compenstion can be accomplished with a controlling signal at contact 99.

Figure 3B:
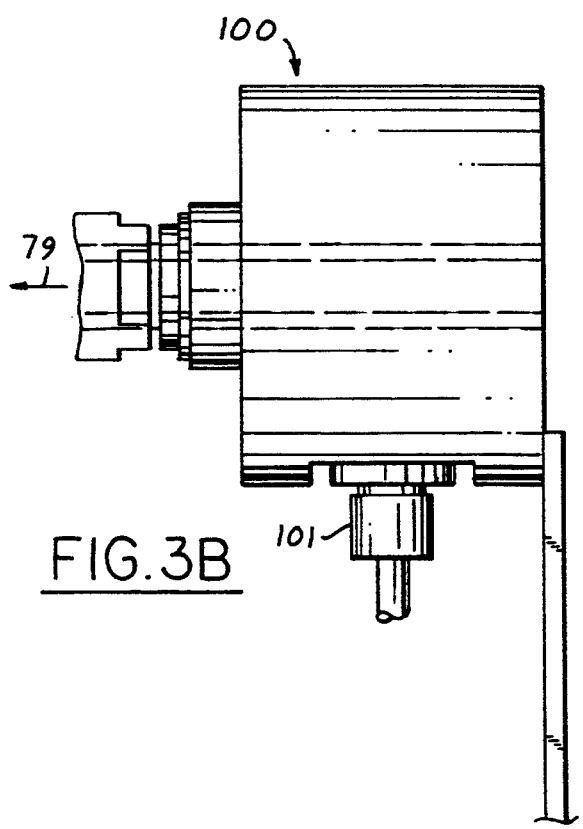
FIG. 3B is a further modified slip ring assembly which may be used for electrical connection in the compensator illustrated in FIG. 3.
Figure 4:
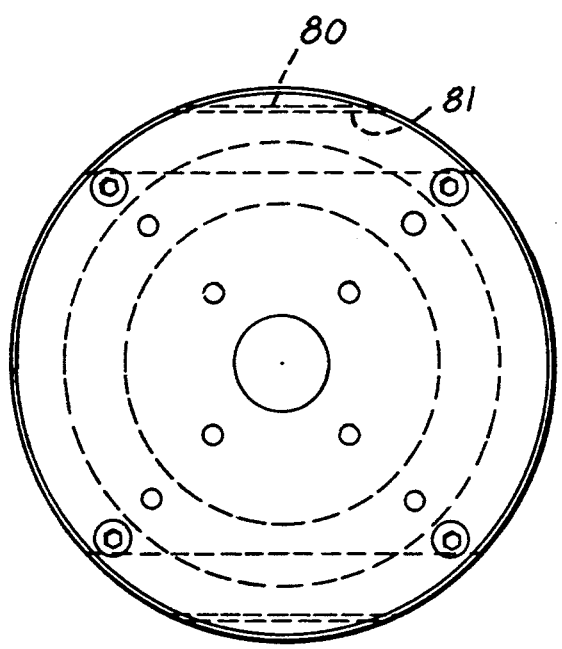
FIG. 4 is an end view of the compensator illustrated in FIG. 3.

With reference to FIG. 3B, a further alternative electrical control signal may be provided through slip ring assembly 100 coupled to tool compensation signal through a multi-pin connector 101 and through appropriate slip rings to multiple conductor 79a and the piezoelectric stack 75. In this case, piezoelectric stack 75 is provided with displacement strain gage 102 attached to its body which is connected to the slip ring assembly through the multiple conductor 79a, thereby accommodating a feedback of the position of the piezoelectric stack 75 during tool compensation.

In general, each of the embodiments provides a system of tool wear compensation with closed loop feedback responsive to physical position of the adjusted tool point position; that is a physical verification that the adjustment called for by part gaging indicating the extent of tool wear has not only produced corresponding adjustment actuation of tool position control elements, but has verified by direct monitoring of tool point displacement through sensing exact axial movement with the tool positioning drawbar or the piezoelectric stack, in the case of the third embodiment, in order to thereby eliminate any potential for an unsensed failure of the compensation signal to actually generate the required compensation displacement of the tool point.

We claim:

1. Tool wear compensating system comprising means for adjusting effective tool position to compensate for wear, and means to monitor extent of tool adjustment with feedback to provide closed loop tool wear compensation system.

2. System of claim 1 including drawbar means for actuating tool adjustment, and drawbar position sensing means to monitor extent of tool adjustment.

3. System of claim 2 including drawbar ramp surface means for producing said tool adjustment, and coordinated remote drawbar ramp surface means for activating said sensing means.

4. System of claim 3 wherein said sensing means comprises transducer means actuated by said remote ramp surface.

5. System of claim 4 including spindle drive unit for said tool, rotary drawbar extending through said spindle drive unit for adjusting said effective tool position, tool wear compensation means mounted back of said spindle drive unit in concentric alignment with said spindle and the axis of said rotary drawbar, nonrotatable drawbar actuating means with connecting bearings, fluid pressure means for displacing said nonrotatable drawbar actuating means, nonrotatable drawbar extension, and said ramp surface located on said extension for actuating said transducer.

6. System of claim 5 including adjustable stop means for engagement by said extension.

7. System of claim 6 including an electric stepper motor for adjusting said stop.

8. System of claim 4 including a rotary spindle drive unit for said tool, a V-belt and pulley drive unit mounted on the back of said spindle, a tool wear compensation module mounted on the back of said V-belt and pulley drive unit comprising a rotating annular bearing housing having internal bearings, a nonrotating adapter for a stepper motor with built-in lead screw and nut supported by said bearings, and a nonrotating drawbar extending through said spindle, V-belt and pulley drive unit, and adapter connected to said lead screw.

9. System of claim 8 wherein said remote ramp surface is provided on an extension of said lead screw.

* * * * *